July 12, 1955  T. A. McGREW  2,712,732
REFRIGERATING APPARATUS
Filed Sept. 9, 1954  2 Sheets-Sheet 1

INVENTOR.
THOMAS A. MC GREW
BY
HIS ATTORNEY

July 12, 1955  T. A. McGREW  2,712,732
REFRIGERATING APPARATUS
Filed Sept. 9, 1954                          2 Sheets-Sheet 2
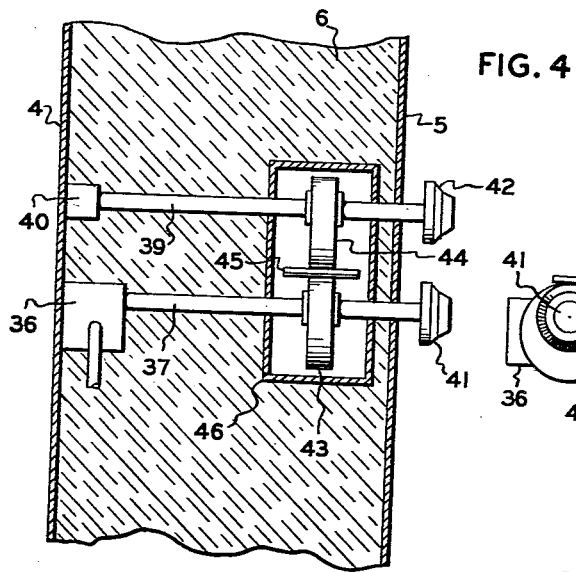
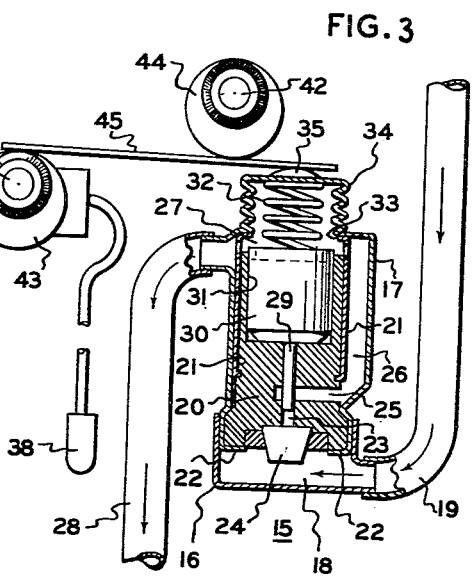
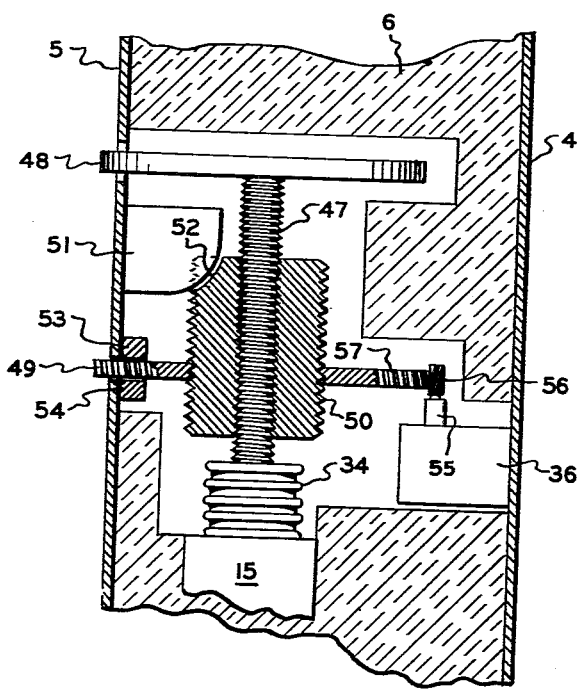
INVENTOR.
THOMAS A. McGREW
BY
HIS ATTORNEY

United States Patent Office 2,712,732
Patented July 12, 1955

2,712,732

REFRIGERATING APPARATUS

Thomas A. McGrew, Fern Creek, Ky., assignor to General Electric Company, a corporation of New York Application September 9, 1954, Serial No. 454,923

17 Claims. (Cl. 62—4)

My invention relates to refrigerating apparatus and more particularly to household refrigerating apparatus having a pair of diverse temperature compartments.

In apparatus of this latter type a separate evaporator is ordinarily provided for cooling each compartment. The temperature difference between the two evaporators and thus between the two compartments is customarily created by connecting an expansion means, as for example a weighted expansion valve, in the refrigerant conduit joining the two evaporators. The expansion of the refrigerant, of course, causes the second evaporator to operate at a different temperature than the first evaporator. The operation of the refrigerating means, i. e. the condensing unit for supplying refrigerant to the evaporators, is however ordinarily controlled by the temperature of only one of the compartments. The other compartment is only a slave, being refrigerated only when the first compartment sets the refrigerating means in operation. An adjustable temperature control is ordinarily provided in the first compartment in order to allow some variation of the temperature maintained therein. But since the temperature differential between the two compartments is more or less fixed by the expansion valve therebetween, varying the temperature of the first compartment also varies the temperature of the second compartment. Changing the setting of the temperature control so as to raise or lower the temperature of the first compartment also results in the same effect occurring in the other compartment. However, the mere fact that it is desired to change the temperature in one compartment may not mean that it is necessary or desirable to change the temperature in the other compartment. In fact, at times the second compartment may be operating at a satisfactory temperature so that when the temperature of the first compartment is changed by adjusting the temperature control, the temperature of the second compartment is moved away from rather than toward the optimum value. Further, there may be times when the first compartment is operating at the desired temperature but yet the temperature of the second compartment is not at the best point for the types of food being stored.

Therefore, it is a primary object of my invention to provide a new and improved dual compartment refrigerator in which the temperature of either compartment may be selectively varied without affecting the temperature of the other compartment.

It is another object of my invention to provide a new and improved refrigeration system having two diverse temperature evaporators, the temperature of either of which may be selectively varied without affecting the temperature of the other.

A further object of my invention is to provide a new and improved expansion valve adapted for use in a dual evaporator refrigeration system, which valve together with a single temperature responsive compressor control permits the selective variation of the temperature of either of the evaporators without affecting the temperature of the other.

Another object of my invention is to provide in a dual evaporator refrigeration system having an adjustable expansion valve and a single temperature responsive compressor control, new and improved means for operating the valve and the compressor control whereby upon the movement of a first control knob the temperature of one evaporator only is changed and upon the movement of a second control knob the temperature of the other evaporator only is changed.

Still another object of my invention is to provide in a dual evaporator refrigeration system including an adjustable expansion valve and a single temperature responsive compressor control, an improved cam and lever arrangement for operating the valve and the compressor control whereby the temperature of either evaporator may be varied without affecting the temperature of the other evaporator.

A still further object of my invention is to provide an improved differential screw control means for use with a dual evaporator refrigerating system including an adjustable expansion valve and a single temperature responsive compressor control, which differential screw control means is adapted so to operate the adjustable expansion valve and the compressor control that the temperature of either evaporator may be varied without affecting the temperature of the other evaporator.

In carrying out one aspect of my invention I provide refrigerating apparatus having a cabinet in which are defined a low temperature compartment and a higher temperature compartment. A separate evaporator is mounted in the cabinet for cooling each of these compartments and a refrigerant condensing unit comprising a compressor and a condenser is provided for supplying refrigerant to the evaporators. By my invention I so control these evaporators that the temperature of either of them and thus the temperature of its respective compartment may be varied without affecting the temperature of the other. To accomplish this the two evaporators are connected together by an adjustable expansion valve; an adjustable, temperature responsive, compressor control is mounted to cycle the condensing unit in response to the temperature of one of the compartments; and means are provided both for simultaneously and proportionately adjusting the valve and the compressor control and for adjusting the valve alone separately of the compressor control. To effect a temperature change in the one compartment without affecting the temperature of the other compartment the means are operated which simultaneously and proportionately adjust the compressor control and the expansion valve, and to change the temperature of the other compartment without affecting the temperature of the first compartment the means are operated which adjust the expansion valve only. The means for simultaneously adjusting the valve and the compressor control and the means for separately adjusting the valve may be combined into a single operating device in which the movement of one knob adjusts both the valve and the temperature control and the movement of a second knob adjusts the valve only.

The novel features which I believe to be characteristic of my invention are set forth with particularity in the appended claims. My invention, however, both as to its organization and method of operation may be best understood by reference to the following description taken in conjunction with the accompanying drawings in which:

Fig. 3 is a diagrammatic view in partial section of one embodiment of my improved temperature control means;

Fig. 4 is a fragmentary sectional view showing the control means of Fig. 3 mounted in a wall of the refrigerator of Fig. 1; and, Fig. 5 is a fragmentary sectional view showing another embodiment of my improved temperature control means mounted in a wall of the refrigerator.

Figure 1:
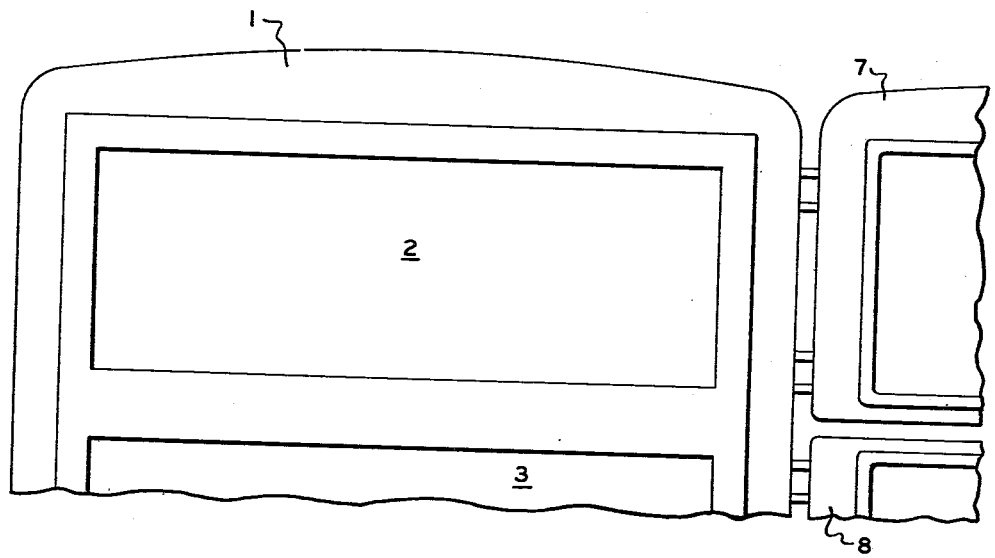
Fig. 1 is a fragmentary frontal view of a two compartment household refrigerator including my new and improved means for varying the temperature of one compartment without affecting the temperature of the other compartment.

Referring now to Fig. 1 I have shown therein a household refrigerator 1 as exemplary of the diverse temperature refrigerating apparatus to which my invention may be adapted. This refrigerator 1 includes an insulated cabinet in which are defined an upper freezing compartment 2 and a lower fresh food compartment 3. Each of these compartments has on outer wall or case and a spaced inner wall or liner, the space between the walls being filled with heat insulating material. For example the outer case 4, the inner liner 5, and the heat insulating material 6 of fresh food compartment 3 may be seen by reference to Fig. 4. Access to the upper low temperature compartment 2 is provided by an insulated door 7, and access to the lower fresh food compartment 3 is provided by a similar insulated door 8.

Figure 2:
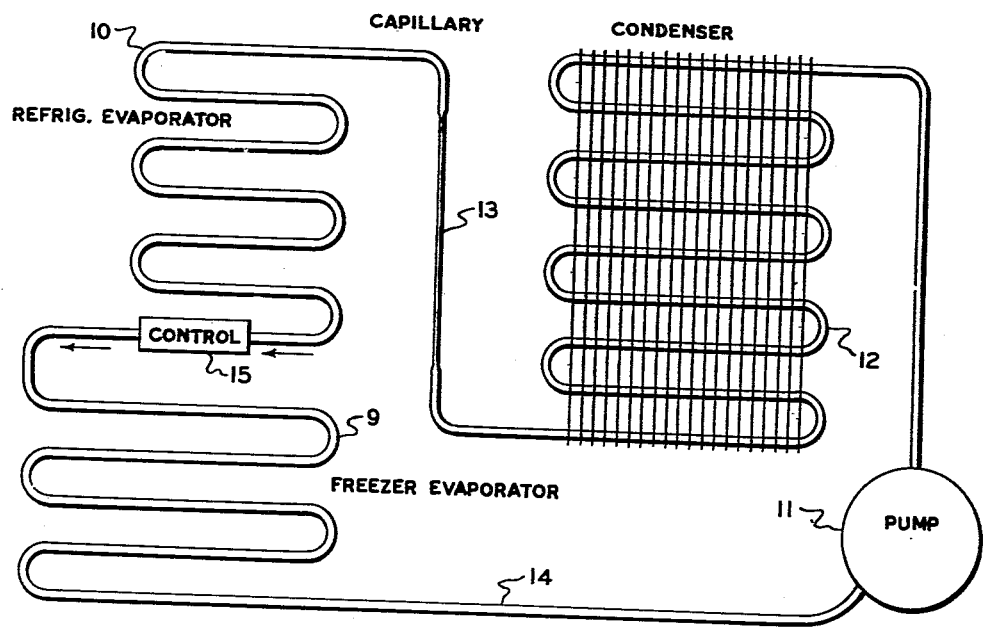
Fig. 2 is a schematic showing of the refrigerating system included in the refrigerator of Fig. 1.

A separate evaporator is provided for cooling each of the compartments 2 and 3. Thus, as may be seen by reference to Fig. 2 an evaporator 9 is provided for cooling the freezing compartment 2 and an evaporator 10 for cooling the higher temperature or fresh food compartment 3. These evaporators may be mounted in any suitable manner to provide the cooling effect. For example, the various tubing passes of the freezer evaporator 9 could be secured to the liner of compartment 2, and the evaporator 10 could be mounted in an inclined or slanted position in the upper portion of the compartment 3. By my invention, however, the two evaporators are so operated and controlled that the temperature of either may be adjusted without affecting the temperature of the other. A description follows of the novel means whereby this independent temperature adjustment is accomplished.

In my preferred embodiment the two evaporators 9 and 10 are connected serially in a closed refrigerant system which includes a condensing unit for supplying them with refrigerant, this condensing unit comprising a pump or compressor 11 and an air-cooled condenser 12. The fresh food evaporator 10 is connected to the discharge of the condensing unit, i. e. to the outlet of condenser 12, by a refrigerant expansion means, as for example the restrictor or capillary tube 13; and the freezer evaporator 9 is connected to the intake of the condensing unit, i. e. the suction of pump 11, by means of a suction conduit 14.

In order to maintain a temperature differential between the two evaporators, they are connected together and the refrigerant circuit thereby completed by means of an adjustable expansion valve 15. This expansion valve 15 constitutes one important feature of my invention for its forms a portion of the means whereby the temperature of either evaporator may be adjusted separately without affecting the temperature of the other evaporator. In Fig. 3 I have shown a novel adjustable expansion valve particularly adapted for this purpose. As there shown this valve 15 includes a lower or intake casing portion 16, and an upper or main casing portion 17, the two casing portions being firmly secured together by any suitable means, as for example by brazing. The lower casing portion 16 defines the intake chamber 18 of the valve, and the intake refrigerant is fed to this chamber by a suitable conduit 19 which leads from the fresh food evaporator 10. Disposed within the upper casing portion 17 and closing the upper end of the intake chamber 18 is a main valve block 20 which is securely held in position by means of brackets 21 and tabs 22 formed or mounted on the casing portion 17. This valve block 20 includes a restricted passageway 23 which at its lower end connects with the intake chamber 18 of the valve through a filter 24. At its upper end the restricted passageway 23 opens into a transverse passageway 25 in the block which in turn connects with a passage 26 lying between the block and the upper case portion 17. At its other end this passage 26 connects to an outlet chamber 27 lying in the upper portion of the valve and from the outlet chamber 27 the refrigerant flows through a suitable conduit 28 to the freezer evaporator 9.

As above mentioned, the purpose of the valve 15 is to provide a means whereby the temperature differential between the compartments may be varied. In order to accomplish this result the valve is so arranged that it can be adjusted to offer different restrictions to the flow of refrigerant passing therethrough. More specifically, for varying the restriction there is provided a movable valve pin or plunger 29 whose lower portion is disposed within the restricted passageway 23. This pin 29 is forced upwardly by the pressure of the refrigerant when the system is operating, and its resultant position relative to the passageway 23 determines the restriction of the valve. At its upper end the valve pin 29 is attached to a weighted piston member 30 which is movably positioned within a large recess 31 formed in the valve block 20. The piston member 30 serves two functions, its weight tends to force the valve pin 29 downwardly into the restricted passageway 23, and also together with the recess 31 it forms a dashpot for preventing undesired oscillation of the valve pin.

The biasing effect of the piston member 30 is further aided by a spring 32 which engages the upper end of the piston. This spring extends upwardly through a suitable aperture 33 provided in the top of the casing member 17 and is disposed within an expansible bellows 34 which covers the opening 33 in the casing. The bellows 34 has a rounded boss 35 mounted on the top thereof and by applying pressure to this boss 35 the spring 32 may be compressed between the bellows and the piston. By compressing the spring a greater biasing force is applied to the pin 29 tending to hold it within the passageway 23, and thereby adjustment of the valve is effected, since for a given refrigerant pressure in the intake chamber the pin will not be moved so far upwardly relative to the passageway 23 as when a lesser biasing force is applied thereto.

Besides the adjustable expansion valve 15, which controls the temperature differential between the two compartments, my improved control means also includes a temperature responsive control device which cycles the compressor 11 on and off so as to maintain a predetermined temperature in one of the two compartments. For example, in the embodiment shown in Fig. 3 this compressor control 36 is arranged so as to be responsive to temperature in the freezer compartment 2. As is well known in the art, by cycling the compressor I mean turning the compressor on whenever the freezer compartment temperature reaches a predetermined higher value above a desired mean temperature and shutting the compressor off whenever the temperature is then reduced to a predetermined lower value below the desired mean temperature. In other words the control 36 turns the compressor 11 on and off so as to periodically supply refrigerant to the evaporator 9 to maintain the freezer compartment within a predetermined narrow temperature range. The control 36 may be any of the conventional cycling controls well-known to the art and is adjustable so that different mean or average temperatures may be maintained within the freezer compartment. In my preferred embodiment this adjustment is accomplished by means of a rotatable control shaft 37 included in the control. The control may be operated by any suitable temperature responsive means, as for example a thermal bulb 38 (Fig. 3) which is placed in contact with the liner of the freezer compartment, and connected to a contact actuating bellows located within the body of the control.

In carrying out my invention I contemplate so operating the temperature responsive compressor control 36 and the expansion valve 15 that the temperature of either of the compartments 2 and 3 may be varied without varying the temperature of the other. In Figs. 3 and 4 I have shown one novel control or operating means for so adjusting the compressor control and the adjustable valve. As there shown this operating means comprises a cam and lever arrangement which is mounted in a wall of the fresh food compartment. The operating means includes the adjusting shaft 37 of the temperature control 36 and second rotatable shaft 39 which is mounted on a bearing member 40 attached to the outer case 4. Both the shafts 37 and 39 extend inwardly through the liner 5 into the fresh food compartment and are each provided with an actuating knob at their inner ends. More specifically the shaft 37 is provided with a knob 41 and the shaft 39 with a knob 42. It should be understood incidentally that the operating means need not necessarily be mounted in the wall and in the manner shown. For example, it could be located in the insulating partition separating the two compartments and have one operating shaft extending into each compartment.

Of the two shafts only the rotation of the shaft 37, of course, effects any adjustment of the temperature responsive compressor control 36, the rotation of the shaft 39 having no effect thereon. But according to my invention rotation of either of the shafts causes an adjustment of the valve 15. For that purpose there is provided on each of the shafts 37 and 38 a separate, eccentrically mounted cam. Thus the shaft 37 is provided with the cam 43 and the shaft 39 with the cam 44. These cams are operative to change the adjustment of the valve 15 by means of a lever member 45 which engages both of the cams and also engages the boss 35 on top of the bellows 34 of the valve. Specifically, in the embodiment illustrated, the cams 43 and 44 and the boss 35 each contact the lever member 45 at a different point, so that both the points of contact of the cams with the lever are spaced from the valve. Further the cam 44 contacts the lever at a point intermediate between the cam 43 and the boss 35 so that either cam acts as a fulcrum for the lever if the other cam is moved. The lever is prevented from moving transversely out of contact with either the cams or the boss by means of an open ended casing 46 which surrounds the lever for a portion of its length.

Since the cam 43 is positioned on the opposite side of the cam 44 from the boss 35, when the cam 43 is rotated it will cause a pivotal movement of the lever on the cam 44 so as either to push down on the boss 35 or else allow it to move upwardly under the force of spring 32 and the refrigerant pressure within bellows 34. This, of course, respectively increases or decreases the force of the spring 32 on the piston 30 and thereby changes the adjustment of the valve. Similarly if the cam 44 is rotated it also will change the setting of the valve. As the cam 44 is rotated, the lever pivots on cam 43 so as to either push down or let up on the boss 35. Thus, again the force of the spring 32 is changed and the valve adjusted. In its position shown in Fig. 3 the cam 44 is at the position wherein it causes its greatest compression of the spring. Conversely the cam 43 is at its position wherein it applies its least possible force to the spring. In other words any movement of the cam 44 from the position shown will decrease the spring force on the piston 30, whereas any movement of the cam 43 will increase it.

In order to understand the operation of my improved refrigeration system and the manner in which the temperature of either of the evaporators may be adjusted without affecting the temperature of the other, let it be assumed that the control knobs and thus the cams 43 and 44 are in their position shown in Fig. 3. Further assuming that the temperature of the freezer compartment 2 is such that the control 36 has turned the compressor on and that it is now running in order to reduce the freezer temperature, the pressure of the refrigerant flowing into the adjustable expansion valve 15 forces the valve pin 29 and the piston 30 upward to partially open the valve. In other words, it forces the pin 29 up somewhat beyond the lower edge of the passageway 25 so that refrigerant may flow through the valve. The mass of the pin and piston in combination with the dashpot effect provided by the movement of the piston in the recess 31 prevent excessive oscillation of the pin. The amount that the valve is opened is, of course, controlled by the weight of the piston 30 and by the biasing force applied thereto by the spring 32. For example, in my preferred embodiment with the control cams in their positions shown, the force of the spring in combination with the mass of the piston is such that the resultant restriction offered by the valve is effective to maintain a temperature differential of about 42° F. between the two evaporators. In other words with this setting of the cams the valve 15 causes such an expansion of the refrigerant flowing therethrough that the second evaporator 9 runs about 42° colder than the first evaporator 10. Also, in this position of the shaft 37 the control 36 is preferably set so that it cycles the compressor to maintain a temperature of approximately 0° in the freezer compartment 2. The operation of the compressor, of course, cools the fresh food evaporator 10 simultaneously with the freezer evaporator 9, and with a temperature differential of 42° between the two evaporators this then results in a temperature of approximately 42° F. in the fresh food compartment.

So long as the cams are kept in these positions, the same temperatures are maintained. The control 36 continues to cycle the compressor on and off so as to maintain the aforesaid temperature in the freezer, and due to the temperature differential created by valve 15 this operation of the compressor also maintains the desired temperature in the fresh food compartment.

Now suppose that it is desired to change the fresh food compartment temperature without varying the freezer compartment temperature. For example, suppose that it is desired to decrease the fresh food compartment temperature from the temperature obtained when the cams are in their illustrated positions, this temperature incidentally being the maximum possible value in my preferred embodiment. To accomplish this the knob 42 is turned so that the cam 44 is moved slightly upward. This allows the lever 45 to move upward pivoting on cam 43 because of the pressure of spring 32 and the refrigerant pressure within bellows 34. Since the spring and the bellows expand as the lever moves the spring force on the piston 30 is decreased. This allows the valve to open wider under the pressure of the refrigerant flow, i. e. the valve pin 29 to move further upward, and thereby the restriction of the valve is decreased. This decreases the pressure differential across the valve and thereby lowers the temperature differential between the evaporators. Since the setting of the control 36 has not been changed, the compressor still cycles on and off to maintain the same temperature of the freezer evaporator 9 as before, that temperature as mentioned above being preferably one which gives a 0° F. freezer compartment temperature. However, since the expansion valve 15 now is open wider and the pressure differential thereacross decreased, the fresh food compartment evaporator 10 will run colder to give a fresh food compartment temperature of some lower value, as for example 38° F. If it is desired to decrease the fresh food compartment temperature even more, it may be accomplished by rotating the knob 42 still further in the same direction. The further the knob is rotated away from the position shown up to 180°, the further is the pressure differential across the valve 15 decreased and the lower is the fresh food compartment temperature obtained. But since this movement of the knob 42 has no effect on the temperature responsive compressor control 36, no matter in what position it is set, the freezer temperature still remains at the same value. The compressor is still cycled on and off to hold the same freezer temperature, and only the temperature of the fresh food compartment is varied. Further, even if shaft 37 and the thus control 36 were set at a different position than the one shown, the turning of knob 42 and shaft 39 would still not change the freezer temperature. No matter what the position of the freezer control the movement of the fresh food compartment control knob 42 changes only the valve setting and thus only the fresh food compartment temperature.

Conversely, suppose that it is desired to vary the temperature of the freezer compartment without varying the temperature of the fresh food compartment. In this case, the knob 41 is turned so as to cause rotation of the shaft 37. This, of course, adjusts the control 36 to cycle the compressor and off in response to different freezer compartment temperatures and thereby results in a change in the temperature of the evaporator 9. In other words, by adjusting the control 36 the compressor 11 is cycled on and off more or less frequently in order to hold the new temperature in the freezer compartment. This adjustment of the temperature control 36, however, does not cause a change in temperature of the fresh food compartment because the movement of knob 41 also effects a simultaneous and proportionate adjustment of the valve 15. In its position shown in Fig. 4 the knob 41 and the cam 43 are at their positions wherein the highest possible freezer temperature is maintained in my preferred embodiment. As the knob 41 is turned therefrom to a colder position not only does shaft 37 adjust control 36 but also the cam 43 pushes the left-hand end of lever 45 (as viewed in Fig. 3) upwardly so that the boss 35 of the top of the bellows is pushed downwardly. This compresses the spring 32 and thereby increases the force on piston 30. This increased force in turn decreases the opening of the valve in response to refrigerant flow therethrough. In other words, the valve restriction and thus the temperature differential thereacross are increased. Specifically, the temperature differential is increased by the same amount as the freezer evaporator temperature is decreased, the control 36 and the valve 15 being simultaneously and proportionately adjusted. This means that the increase in the temperature differential exactly balances out the reduction in the freezer temperature due to the more frequent cycling of the unit, and thereby the same temperature is maintained in the fresh food compartment despite the change in the fresh food compartment temperature. No matter how far the freezer compartment control knob is turned, the control 36 and the valve are simultaneously and proportionately adjusted so that the fresh food temperature remains undisturbed. Further, this holds true in no matter what position the fresh food compartment control knob 42 is set during the movement of the freezer control knob 41. Thus it may be seen that whichever of the control knobs 41 or 42 is turned, the temperature of only its compartment will be changed. The temperature of the other compartment remains the same. Movement of knob 41 adjusts the temperature of the freezer compartment only, whereas movement of knob 42 adjusts the temperature of the fresh food compartment only.

Referring now to Fig. 5 I have shown therein a second embodiment of my invention wherein somewhat different means are provided for adjusting the temperature responsive compressor control 36 and the adjustable valve 15, members in Fig. 5 equivalent or similar to those shown in in Figs. 3 and 4 being numbered identically thereto. In this embodiment I utilize a differential screw means rather than a cam and lever means in order to adjust the control 36 and the adjustable valve 15. But like the cam and lever means, this differential screw means is preferably mounted within the wall of the fresh food compartment, i. e. between the outer case 4 and the inner liner 5 of the fresh food compartment. The differential screw means could, however, be mounted elsewhere as for example in the partition separating the compartments.

In this embodiment of my invention the adjustable valve 15 is controlled by means of a threaded shaft 47 which engages the top of the bellows 34. Through its engagement with the top of the bellows this shaft 47 by moving axially can apply more or less force to the biasing spring 32 of the valve and thereby, of course, adjust the valve. In order to operate this shaft a pair of disc-like control knobs 48 and 49 are provided, both of these knobs extending outwardly into the fresh food compartment through suitable apertures provided in the inner liner 5. The knob 48 is attached directly to the shaft 47 so that its rotation also results in a rotation of the shaft 47. The knob 49 is, however, threaded to the outer surface of a sleeve member 50 which is in turn threaded to the shaft 47 along its inner bore. A tab 51 attached by any suitable means to the liner 5 fits into a recess 52 in the sleeve 50 so as to prevent rotation thereof. The tab 51, however, does not prevent axial movement of the sleeve 50.

Since the sleeve 50 can not rotate and since the shaft 47 is threaded thereto, the shaft 47 therefore moves axially whenever it is turned by knob 48. This axial motion of the shaft so instituted by knob 48, of course, applies more or less force to the top of bellows 34 and thereby adjusts valve 15. Rotation of the knob 49 also accomplishes this same result, i. e. axial movement of the shaft 47 and adjustment of the valve. As above mentioned, the knob 49 is threaded to the sleeve 50, but it is prevented from axial movement along the sleeve by means of a pair of stops 53 and 54 disposed on either side of it and firmly secured to the inner liner 5. Since the knob 49 itself cannot move axially its rotation thereby causes the sleeve 50 to move axially, the tab 51 preventing only rotational movement of the sleeve and not axial movement. This axial movement of the sleeve 50 also carries the shaft 47 along with it and thereby causes an expansion or contraction of the bellows 34 and the spring disposed therein to change the adjustment of the valve 15. In addition to causing adjustment of the valve 15 the knob 49 also is operative to adjust the temperature responsive compressor control 36. The adjusting shaft 55 of the control 36 is provided at its upper end with a helical gear 56 and gear teeth 57 are provided on the knob 49 which mesh with the gear 56. When the knob 49 is turned, this gear arrangement turns the shaft 55 and thereby the temperature control 36 is adjusted. Thus, whereas rotation of the knob 48 causes adjustment of only the valve 15, rotation of the knob 49 causes adjustment of both the valve 15 and the control 36.

Since the rotation of knob 48 causes only an adjustment of the valve whereas the rotation of the knob 49 causes adjustment of both the valve and the temperature control, the same results are secured from this differential screw device as are obtained from the cam and lever device of Figs. 3 and 4. By adjusting valve 15, the rotation of knob 48, of course, changes the temperature differential between the evaporators 9 and 10. However, since the rotation of knob 48 does not affect the temperature control 36, only the temperatures of the fresh food evaporator and compartment are varied. The control 36 will still cycle on and off to maintain the freezer compartment at the same temperature no matter to what position the knob 48 is turned. All the rotation of knob 48 does is change the setting of the valve and thus the temperature differential between the compartments, and as explained above changing the temperature differential varies only the temperature of the fresh food compartment. It will be noted that the movement of the knob 48 and its resultant actuation of the shaft are completely independent of the knob 49 so that the fresh food compartment temperature may be varied no matter what the setting of the freezer control knob.

The rotation of the control disc 49, however, results in a variation of the freezer compartment temperature without changing the fresh food compartment temperature. Since it is geared directly to the control 36 the rotation of the knob 49, of course, changes the position of the control and thereby causes the unit to cycle on and off more or less often to maintain a new freezer temperature. But simultaneously as it adjusts the control 36, the knob 49 also causes an axial movement of the sleeve 50 and the shaft 47 so as to adjust the valve 15. In fact an adjustment of the valve proportionate to the adjustment of the temperature control is obtained. The restriction of the valve is respectively increased or decreased the same amount as the setting of the control 36 is decreased or increased. In other words, the temperature differential across valve 15 is changed exactly the same amount as, and in the reverse direction from, the temperature change effected in the freezer compartment 2 by the adjustment of the control 36. Therefore, since one temperature change balances the other, the fresh food compartment remains at the same temperature even though the temperature of the freezer compartment is varied. This means that the same results are secured through the use of the differential screw device of Fig. 5 as from the cam and lever arrangement of Figs. 3 and 4. With both arrangements, the temperature of either of the two compartments may be varied without affecting the temperature of the other compartment.

While in accordance with the patent statutes I have described what at present are considered to be the preferred embodiments of my invention it will be obvious to those skilled in the art that various changes and modifications may be made therein without departing from my invention, and I, therefore, aim in the appended claims to cover all such changes and modifications as fall within the true spirit and scope of my invention.

What I claim as new and desire to secure by Letters Patent of the United States is:

1. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of one of said compartments and adjustable to effect different temperatures therein, means including a first movable actuating member for adjusting said expansion valve independently of said control thereby to vary the temperature of the other of said compartments without affecting the temperature of said one compartment, and means including a second movable actuating member for simultaneously and proportionately adjusting said control and said expansion valve thereby to vary the temperature in said one compartment without affecting the temperature of said other compartment.

2. Refrigerating apparatus comprising an insulated cabinet, a low temperature compartment and a higher temperature compartment defined in said cabinet, a first evaporator for cooling said low temperature compartment, and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of said low temperature compartment and adjustable to maintain different temperatures therein, means including a first movable actuating member for adjusting said expansion valve independently of said control thereby to vary the temperature of said higher temperature compartment without affecting the temperature of said lower temperature compartment, and means including a second movable actuating member for simultaneously and proportionately adjusting said control and said expansion valve thereby to vary the temperature in said low temperature compartment without affecting the temperature of said higher temperature compartment.

3. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting the said first evaporator to the intake of said condensing unit, an adjustable expansion valve connecting together said evaporators to effect an adjustable temperature differential between said compartments, a temperature responsive control for cycling said condensing unit in response to the temperature of one of said compartments and adjustable to maintain different temperatures therein, means including a rotatable control knob and a valve adjusting member actuated by said knob for adjusting said expansion valve thereby to vary the temperature of the other of said compartments without affecting the temperature of said one compartment, and means including a second rotatable control knob and said valve adjusting member for simultaneously adjusting said control and said expansion valve thereby to vary the temperature of said one compartment without affecting the temperature of said other compartment.

4. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of one of said compartments, and means for adjusting said control and said valve to vary separately the temperature in either of said compartments, said means including said first and second rotatable shafts with said first shaft being connected to said control for adjusting said control, a lever member engaging said valve for effecting adjustment of said valve, a first cam mounted on said first shaft and engaging said lever member at a first point spaced from said valve, a second cam mounted on said second shaft and engaging said lever at a second point spaced from both said valve and said first point, each of said cams being effective upon the turning thereof to cause pivotal movement of said lever on the other of said cams thereby to adjust said valve, whereby rotation of said first shaft simultaneously and proportionately adjusts said control and said valve to vary the temperature of said one compartment without affecting the temperature of the other compartment and rotation of said second shaft adjusts said valve to vary the temperature of said other compartment without affecting the temperature of said one compartment.

5. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of said low temperature compartment and adjustable to maintain different temperatures therein, and means for adjusting said control and said valve to vary separately the temperature in either of said compartments, said means including first and second rotatable shafts with said first shaft being connected to said control for adjusting said control, a lever member engaging said valve for effecting adjustment of said valve, a first cam mounted on said first shaft and engaging said lever member at a first point spaced from said valve, a second cam mounted on said second shaft and engaging said lever at a second point spaced from both said valve and said first point, each of said cams being effective on the turning thereof to cause pivotal movement of said lever on the other of said cams thereby to adjust said valve, whereby movement of said second shaft adjusts said valve to vary the temperature of said higher temperature compartment without affecting the temperature of said low temperature compartment and movement of said first shaft simultaneously and proportionately adjusts said control and said valve to vary the temperature of said low temperature compartment without affecting the temperature of said higher temperature compartment.

6. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator and said second evaporator to effect an adjustable temperature differential between said compartments, a temperature responsive control for cycling said condensing unit in response to the temperature of one of said compartments and adjustable to maintain different temperatures therein, and means for adjusting said temperature responsive control and said valve to vary separately the temperature in either of said compartments, said means including a threaded shaft engaging said valve for adjusting said valve upon the axial movement thereof, a first rotatable member for turning said shaft, a sleeve member threaded around said shaft, means preventing rotation of said sleeve member to cause axial movement of said shaft upon the turning of said first rotatable member, a second rotatable member threaded around said sleeve member, said second rotatable member being connected to adjust said temperature responsive control on the turning thereof, and means preventing axial movement of said second rotatable member to cause axial movement of said sleeve member and said shaft upon the turning of said second member, whereby said valve is adjusted upon the turning of said first rotatable member to vary the temperature of the other of said compartments without affecting the temperature of said one compartment and said temperature responsive control and said valve are simultaneously and proportionately adjusted upon the turning of said second rotatable member to vary the temperature of said one compartment without affecting the temperature of said other compartment.

7. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator and said second evaporator to effect an adjustable temperature differential between said compartments, a temperature responsive control for cycling said condensing unit in response to the temperature of said low temperature compartment and adjustable to maintain different temperatures therein, and means for adjusting said temperature responsive control and said valve to vary separately the temperature in either of said compartments, said means including a threaded shaft engaging said valve for adjusting said valve upon the axial movement thereof, a first rotatable member for turning said shaft, a sleeve member threaded around said shaft, means preventing rotation of said sleeve member to cause axial movement of said shaft upon the turning of said first rotatable member, a second rotatable member threaded around said sleeve member, said second rotatable member being connected to adjust said temperature control on the turning thereof, and means preventing axial movement of said second rotatable member to cause axial movement of said sleeve member and said shaft upon the turning of said second member, whereby said valve is adjusted upon the turning of said first rotatable member to vary the temperature of said higher temperature compartment without affecting the temperature of said low temperature compartment and said temperature responsive control and said valve are simultaneously and proportionately adjusted upon the turning of said second rotatable member to vary the temperature of said low temperature compartment without affecting the temperature of said higher temperature compartment.

8. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of one of said compartments and means for adjusting said temperature control and said valve to vary separately the temperature in either of said compartments, said means including two rotatable knobs and a differential screw means actuated by said knobs, said differential screw means being adapted to adjust only said valve on the movement of one of said knobs and to adjust simultaneously both said valve and said control on the movement of the other of said knobs, whereby upon the movement of said one knob the temperature of the other of said compartments is varied without affecting the temperature of said one compartment and upon the movement of said other knob the temperature of said one compartment is varied without affecting the temperature of said other compartment.

9. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerator condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of said low temperature compartment, and adjustable to maintain different temperatures therein and means for adjusting said temperature control and said valve to vary separately the temperature in either of said compartments, said means including two rotatable knobs and a differential screw means actuated by said knobs, said differential screw means being adapted to adjust only said valve on the movement of one of said knobs and to adjust simultaneously both said valve and said control on the movement of the other of said knobs, whereby upon the movement of said one knob the temperature of said higher temperature compartment is varied without affecting the temperature of said low temperature compartment and upon the movement of said other knob the temperature of said low temperature compartment is varied without affecting the temperature of said higher temperature compartment.

10. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of one of said compartments and adjustable to maintain different temperatures therein, and means for adjusting said control and said valve to vary separately the temperature in either of said compartments, said means including two rotatable knobs and a cam and lever means actuated by said knobs, said cam and lever means being adapted to adjust simultaneously both said valve and said control on the movement of the one of said knobs, and to adjust only said valve on the movement of the other of said knobs, whereby upon the movement of said one knob the temperature of said one compartment is varied without affecting the temperature of the other compartment and upon the movement of said other knob the temperature of said other compartment is varied without affecting the temperature of said one compartment.

11. Refrigerating apparatus comprising an insulated cabinet, a low temperature compartment and a higher temperature compartment defined in said cabinet, a first evaporator for cooling said low temperature compartment and a second evaporator for cooling said higher temperature compartment, a refrigerant condensing unit, means including an expansion means connecting said second evaporator to the discharge of said condensing unit, means connecting said first evaporator to the intake of said condensing unit, an adjustable expansion valve connecting said first evaporator to said second evaporator to effect an adjustable temperature differential between said compartments, a temperature responsive control for cycling said condensing unit in response to the temperature of said low temperature compartment and adjustable to maintain different temperatures therein, and means for adjusting said control and said valve to vary separately the temperature in either of said compartments, said means including two control knobs and a cam and lever means actuated by said knobs, said cam and lever means being adapted to adjust only said valve on the movement of one of said knobs and to adjust simultaneously both said valve and said control on the movement of the other of said knobs, whereby upon the movement of said one knob the temperature of said higher temperature compartment is varied without affecting the temperature of said low temperature compartment and upon the movement of said other knob the temperature of said low temperature compartment is varied without affecting the temperature of siad higher temperature compartment.

12. For use with a refrigeration system including a pair of serially connected diverse temperature evaporators and a condensing unit for supplying refrigerant to said evaporators, means for separately controlling the temperature of said evaporators comprising a temperature responsive control for cycling said condensing unit in response to the temperature of one of said evaporators and adjustable to maintain different temperatures thereof, an adjustable expansion valve connecting together said evaporators and adapted to effect an adjustable temperature differential therebetween, and means for adjusting said temperature responsive control and said valve to vary selectively the temperature of either of said evaporators, said last mentioned means including a lever member for adjusting said valve, a pair of cams for actuating said lever member, and a pair of rotatable shafts each for turning one of said cams, with one of said shafts being connected to said control for adjusting said control, whereby said valve and said control are simultaneously and proportionately adjusted upon the turning of said one shaft to vary the temperature of said one evaporator without affecting the temperature of the other of said evaporators and said valve only is adjusted upon the turning of the other of said shafts to vary the temperature of the other evaporator without affecting the temperature of said one evaporator.

13. For use with a refrigeration system including a pair of serially connected diverse temperature evaporators and a condensing unit for supplying a refrigerant to said evaporators, means for separately controlling the temperatures of said evaporators comprising a temperature responsive control for cycling said condensing unit in response to the temperature of one of said evaporators and adjustable to maintain different temperatures thereof, an adjustable expansion valve connecting together said evaporators and adapted to effect an adjustable temperature differential therebetween, and means for adjusting said control and said valve to vary selectively the temperature of either of said evaporators, said last mentioned means including a threaded shaft for actuating said valve, a sleeve threaded on said shaft, a first rotatable member for turning said shaft, a second rotatable member for actuating said sleeve, with one of said rotatable members being connected to said temperature control for adjusting said control, whereby said valve and said control are simultaneously and proportionately adjusted upon the turning of said one rotatable member to vary the temperature of said one evaporator without affecting the temperature of the other of said evaporators and said valve only is adjusted upon the turning of the other of the rotatable members to vary the temperature of said other evaporator without affecting the temperature of said one evaporator.

14. For use with a refrigeration system including a pair of serially connected diverse temperature evaporators and a condensing unit for supplying refrigerant to said evaporators, means for separately controlling the temperatures of said evaporators comprising a temperature responsive control for cycling said condensing unit in response to temperature of one of said evaporators, and adjustable to maintain different temperatures thereof, an adjustable expansion valve connecting said evaporators and adapted to effect an adjustable temperature differential therebetween, and means for adjusting said control and said valve to vary separately the temperature of either of said evaporators, said last-mentioned means being adapted to adjust said expansion valve independently of said control thereby to vary the temperature of the other of said evaporators without affecting the temperature of said one evaporator and to simultaneously and proportionately adjust said control and said expansion valve thereby to vary the temperature of said one evaporator without affecting the temperature of said other evaporator.

15. For use with a refrigeration system including a pair of serially connected diverse temperature evaporators and a condensing unit for supplying refrigerant to said evaporators, means for separately controlling the temperatures of said evaporators comprising a temperature responsive control for cycling said condensing unit in response to the temperature of one of said evaporators and adjustable to maintain different temperatures thereof, an adjustable expansion valve connecting together said evaporators and adapted to effect an adjustable temperature differential therebetween, said valve including a restricted passageway, a movable plunger for controlling the flow through said passageway, means including a weighted member and a spring normally biasing said plunger in a direction to close said passageway, and an expansible bellows disposed around at least a portion of said spring to allow for the expansion and contraction thereof whereby the biasing force on said plunger may be varied, an operating member engaging said valve for adjusting the force on said spring thereby to vary the restriction offered to refrigerant flow by said valve, and means for adjusting said temperature responsive control and said valve thereby to vary separately the temperature of either of said evaporators, said means including a first rotatable member connected to actuate said operating member without actuating said temperature control, whereby the temperature of the other of said evaporators is varied without affecting the temperature of said one evaporator, and a second rotatable member connected to simultaneously and proportionately actuate said temperature responsive control and said operating member, whereby the temperature of said one evaporator is varied without affecting the temperature of said other evaporator.

16. For use with a refrigeration system including a pair of serially connected diverse temperature evaporators and a condensing unit for supplying refrigerant to said evaporators, means for separately controlling the temperatures of said evaporator comprising a temperature responsive control for cycling said condensing unit in response to the temperature of one of said evaporators and adjustable to maintain different temperatures thereof, an adjustable expansion valve connecting together said evaporators and adapted to effect an adjustable temperature differential therebetween, said valve including a restricted passageway, a movable plunger for controlling the flow through said passageway, means including a weighted member and a spring normally biasing said plunger in a direction to close said passageway, and an expansible bellows disposed around at least a portion of said spring to allow for the expansion and contraction thereof whereby the biasing force on said plunger may be varied, and cam and lever means for adjusting said temperature responsive control and said valve to selectively vary the temperature of either of said evaporators, said cam and lever means including a lever engaging said valve for adjusting the force on said spring thereby to vary the restriction offered to refrigerant flow by said valve, a pair of cams for actuating said lever, and a pair of rotatable shafts each for turning one of said cams, with one of said shafts being connected to said control for adjusting said control, whereby said valve and said control are simultaneously and proportionately adjusted upon the turning of said one shaft to vary the temperature of said one evaporator without affecting the temperature of the other of said evaporators and said valve only is adjusted upon the turning of the other of said shafts to vary the temperature of the other evaporator without affecting the temperature of said one evaporator.

17. For use with a refrigeration system including a pair of serially connected diverse temperature evaporators and a condensing unit for supplying refrigerant to said evaporators, means for separately controlling the temperatures of said evaporator comprising a temperature responsive control for cycling said condensing unit in response to the temperature of one of said evaporators and adjustable to maintain different temperatures thereof, an adjustable expansion valve connecting together said evaporators and adapted to effect an adjustable temperature differential therebetween, said valve including a restricted passageway, a movable plunger for controlling the flow through said passageway, means including a weighted member and a spring normally biasing said plunger in a direction to close said passageway, an expansible bellows disposed around at least a portion of said spring to allow for the expansion and contraction thereof whereby the biasing force on said plunger may be varied, and differential screw means for adjusting said temperature responsive control and said valve to selectively vary the temperature of either of said evaporators, said differential screw means including a threaded shaft engaging said valve for adjusting the force on said spring thereby to vary the restriction offered to refrigerant flow by said valve, a sleeve threaded on said shaft, a first rotatable member for turning said shaft, a second rotatable member for actuating said sleeve, with one of said rotatable members being connected to said temperature control for adjusting said control, whereby said valve and said control are simultaneously and proportionately adjusted upon the turning of said one rotatable member to vary the temperature of said one evaporator without affecting the temperature of the other of said evaporators and said valve only is adjusted upon the turning of the other of the rotatable members to vary the temperature of said other evaporator without affecting the temperature of said one evaporator.

References Cited in the file of this patent
UNITED STATES PATENTS 2,239,583    Schmieding _____ Apr. 22, 1941